United States Patent
Schlimgen et al.

(10) Patent No.: US 6,699,006 B2
(45) Date of Patent: Mar. 2, 2004

(54) METHOD AND APPARATUS FOR STACKING CONTAINERS COMPRISING THERMOPLASTIC, AND APPARATUS FOR EXECUTING THE METHOD

(75) Inventors: Stefan Schlimgen, Heilbronn-Böckingen (DE); Michael Wozny, Heilbronn (DE)

(73) Assignee: Adolf Illig Maschinenbau GmbH & Co., Heilbronn (DE)

(*) Notice: Subject to any disclaimer, the term of this patent is extended or adjusted under 35 U.S.C. 154(b) by 197 days.

(21) Appl. No.: 09/764,146

(22) Filed: Jan. 19, 2001

(65) Prior Publication Data

US 2002/0018709 A1 Feb. 14, 2002

Related U.S. Application Data (63) Continuation of application No. 09/617,793, filed on Jul. 17, 2000, now abandoned.

(30) Foreign Application Priority Data

Jul. 16, 1999 (DE) .......................... 199 33 355

(51) Int. Cl.[7] ............................... B65G 57/16
(52) U.S. Cl. .................. 414/801; 53/542; 414/790.4; 414/798.4
(58) Field of Search ................ 53/542; 414/790.3, 414/790.4, 798.4, 798.7, 801, 802

(56) References Cited

U.S. PATENT DOCUMENTS

| 5,636,722 | A | | 6/1997 | Koop ...................... 198/347.1 |
| 6,042,360 | A | * | 3/2000 | Padovani .................. 425/403.1 |
| 6,135,756 | A | * | 10/2000 | Arends ........................ 425/398 |

FOREIGN PATENT DOCUMENTS

| DE | 7330214 | 2/1975 |
| DE | 26 48 563 | 5/1978 |
| DE | 32 02 770 | 8/1983 |
| DE | 296 08 477 | 10/1997 |
| DE | 298 02 318 | 6/1998 |
| EP | 1 000 887 | 5/2000 |

* cited by examiner

Primary Examiner—Janice L. Krizek
(74) Attorney, Agent, or Firm—Venable LLP; John P. Shannon; Stuart I. Smith (57) ABSTRACT

A method to improve the stacking of containers comprising thermoplastic plastic, and the transfer of the stacks to a successive device. Stacks of a predetermined number are intended to be produced without disturbances, even with a high cycle number of the shaping tool. This is achieved in that the containers are stacked in a first stack magazine, which is exchanged for an adjacent stack magazine between two cycles of the shaping tool after the predetermined number has been reached. The containers are stacked in the stack magazines directly from the shaping tool, or by an intermediate transfer device.

19 Claims, 7 Drawing Sheets

METHOD AND APPARATUS FOR STACKING CONTAINERS COMPRISING THERMOPLASTIC, AND APPARATUS FOR EXECUTING THE METHOD

CROSS REFERENCE TO RELATED APPLCIATIONS

This application is a continuation of U.S. application Ser. No. 09/617,793 filed Jul. 17, 2000, now abandoned.

This application is related to concurrently filed U.S. application Ser. No. 09/764,145 which is a continuation of U.S. application Ser. No. 09/617,974, both now abandoned.

BACKGROUND OF THE INVENTION

The invention relates to a method for stacking containers that have been shaped and punched from a sheet of thermoplastic plastic in a shaping tool, and guided to stack magazines, as defined in the preamble to the main claim. The invention further relates to an apparatus for executing the method.

It is known to stack containers that have been shaped and punched from a sheet of thermoplastic plastic in stack magazines, and to remove the stacks from the stack magazines when a specific length or specific piece number is attained, then supply them to successive devices. In these successive devices, either processing takes place, such as bordering of the container edge, or the rods are packaged in foil and transferred to cartons. It is also known to shape the containers in a plurality of rows, with several containers per row, and to guide the stacks consecutively with a transfer device, so they pass through a single bordering station, for example. Stack magazines for receiving the total batch of containers shaped per cycle in the shaping tool are disposed in front of the shaping tool, which is pivoted into the transfer position.

Transporting stacks of specific lengths out of the stack magazines stipulates a certain amount of time. During this time, the shaping tool must continue producing, and the containers must be able to be stacked. German utility model application DE 298 02 318 U 1 proposes to arrange a stationary stack magazine in the stacking station, and above it, a movable stack magazine, with the movable stack magazine being displaceable in both the stacking direction and the direction transverse thereto. The containers are first transferred into the stationary stack magazine, then enter the movable stack magazine after a specified stack height has been attained.

German Patent DE-PS 26 48 563 C 2 likewise discloses transferring the containers into a stationary, lower stack magazine initially, then into a stack magazine that is adjustable in height and lifts a stack once it reaches a specific length or a specific number of containers. A lateral sliding element transfers these stacks to a horizontal receiving sheet.

Handling stacks in this manner does not provide consecutive guidance of the stacks. They would have to be taken up again, a process that would be susceptible to disturbances. A disadvantage of the two cited publications is that, during the time in which the stacks are transferred from the stack magazines, the number of stacked containers depends on the cycle number of the shaping tool. The transfer time of the stacks is constant because of the established paths and speeds of the drives. This means, however, that a varying number of containers is shaped and stacked during this transfer time. This is significant, and is associated with control problems, if stacks are to be formed from a specific number of containers. A further drawback of the two stacking methods is that the containers must be pressed over two stacking edges, which always poses a risk of deformation. As the movable stack magazine returns, it must be pushed across the standing stacks, which can also cause deformation, because each container edge of the standing containers must be guided by these retaining elements. This method of gripping containers is highly susceptible to disturbances, which may necessitate shutting down the shaping machine, cleaning the stack magazines or organizing the containers located in the stack magazines.

It is the object of the invention to execute the method in order to create stacks of a predetermined number of containers, regardless of the cycle number of the shaping tool, and independently of the time required for transferring the stacks to successive devices, even if the apparatus is shut down. The method is intended to be insusceptible to disturbances, and able to be executed even with high cycle numbers of the shaping tool. Furthermore, the method should permit the transfer of container stacks in rows to a successive device, and a fast changeover of the apparatus for a different batch of containers.

SUMMARY OF THE INVENTION

The above object generally is achieved according to a first aspect of the invention by a method for stacking containers that have been shaped and punched from a sheet of thermoplastic plastic in a shaping tool, and guided to stack magazines, and for transferring the stacks to a successive device, wherein the containers are transferred into a first stack magazine at a stacking station; after a predetermined number of containers per stack has been attained in the first stack magazine, the first stack magazine is displaced into a stack-removal station, and a second stack magazine is transferred out of the stack-removal station into the stacking station, between two cycles of the shaping tool; and while the containers are being stacked in the second stack magazine at the stacking station, the first stack magazine is emptied, and the removed stacks are guided to a successive device.

The above object generally is achieved according to a second aspect of the invention by an apparatus for stacking containers that have been ejected from a shaping tool after being shaped and punched out with, for executing the method according to the invention wherein two stack magazines, which can be displaced between a stacking station and a stack-removal station are provided.

The method is described in detail in conjunction with the schematic drawings of various embodiments of the apparatus.

DETAILED DESCRIPTION OF THE PREFERRED EMBODIMENTS

Figure 1:
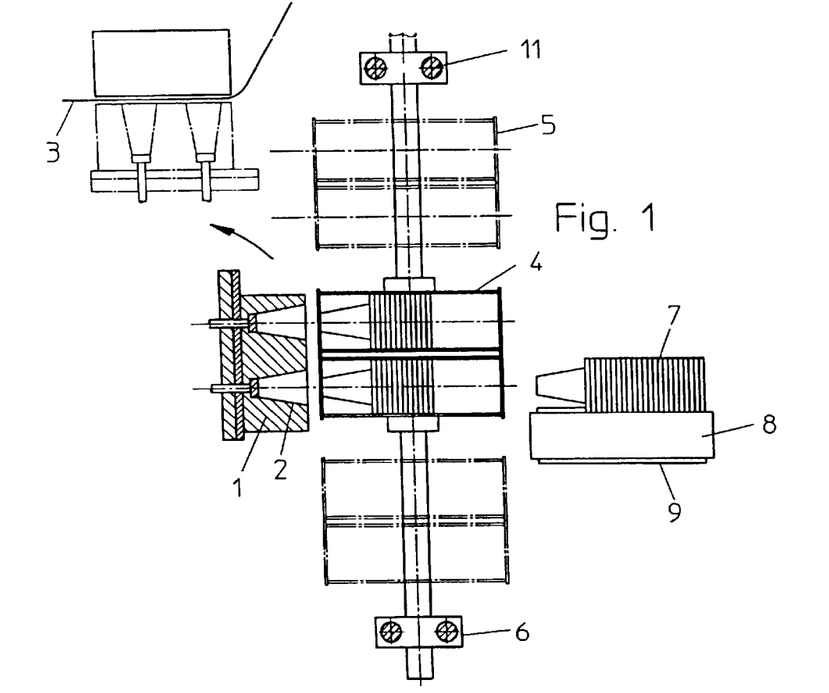
FIG. 1 is a side view of the apparatus according to the invention.
Figure 2:
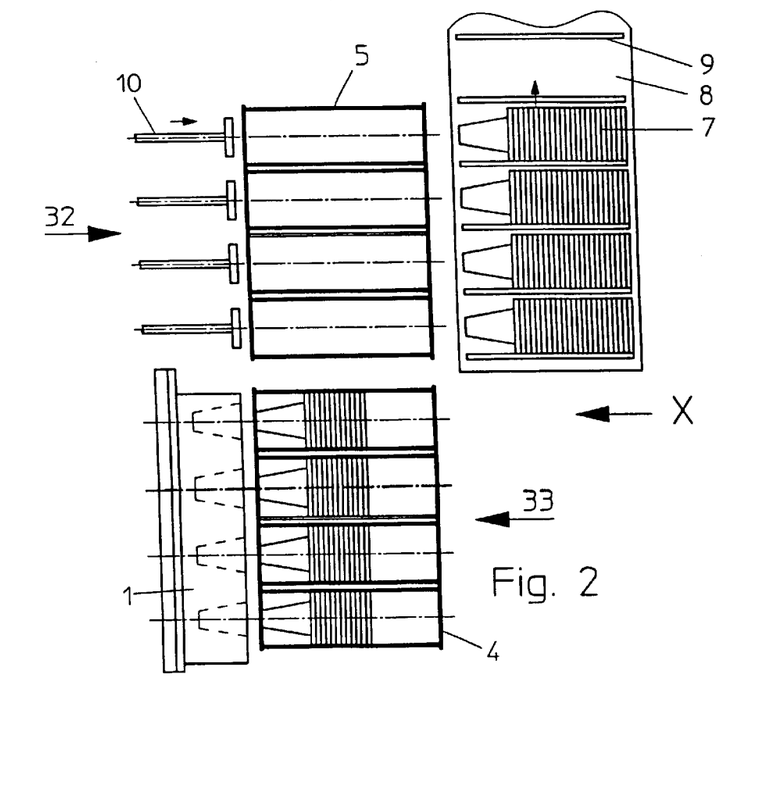
FIG. 2 is a plan view of the apparatus according to the invention.

Referring now to FIG. 1, the apparatus for executing the method of the invention is disposed downstream of a thermoforming machine, which employs a shaping tool 1 to shape and punch containers 2 from a heated sheet 3 of thermoplastic plastic. In the illustrated examples, one half of the shaping tool 1 is embodied to pivot to a horizontal position, so that the containers 2 are ejected horizontally from the shaping tool 1 by, for example, push-rods. Other directions of ejection are also feasible for the method of the invention, such as with the pivoting of the shaping tool 1 by only 75° rather than 90° from the vertical.

In an apparatus according to a first embodiment, as illustrated in FIGS. 1 through 4, a first stack magazine 4 is disposed sufficiently close to the opening of the pivoted shaping tool 1 that the containers 2 can be stacked directly in the magazine—this position is referred to as the stacking station 33. Retaining elements retain the containers 2 in a known manner. The stack magazine 4 is adjustable in height, and can be lowered from the stacking station 33 (position A in FIG. 3) while a second stack magazine 5 is brought into position A. This movement occurs between two work cycles of the shaping tool 1. The lowered stack magazine 4 can now be displaced horizontally by a motorized or pneumatic drive, not shown, by a distance greater than its structural width, until it reaches the position B in FIG. 3. The magazine is supported and guided by guides 6. From this position B, the magazine is raised in stages into a stack-removal station 32, where first the upper row of stacks 7 stops at the height of a transverse transport belt 8 having transverse supports 9 (position shown in FIG. 4). Sliding elements or push-rods 10 eject a row of stacks 7 onto the transport belt 8. The transport belt 8 guides the stacks 7—possibly via a further transport belt—to a site of further processing or handling. The stack magazine 4 is raised again, so the next row of stacks 7 can be ejected. With three-row stack magazines, the third stack row is cleared in the same manner.

Once the stack magazine 4 has been emptied, it is lowered and guided back into the position A. It waits there until the predetermined number of containers 2 per stack 7 has been attained in the stack magazine 5. Then, the stack magazines 4 and 5 are exchanged between two cycles of the shaping tool 1, with the stack magazine 5 being raised into the position D and the stack magazine 4 assuming its stacking position. The stack magazine 5 can be adjusted in height by way of a drive, and displaced horizontally by way of a second drive, until it reaches the position E (FIG. 3), thereby being guided and supported by guides 11. From the position E, the magazine is lowered in stages, so the individual stack rows can be guided in front of the transport belt 8 and ejected.

Figure 3:
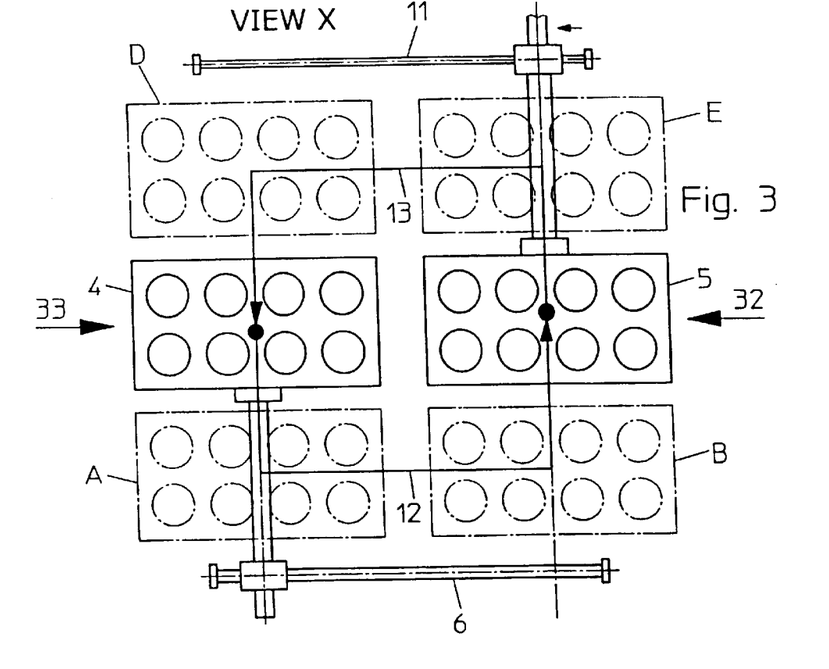
FIGS. 3 and 4 are views in the direction X of FIG. 2 in two phases of the method for a first embodiment of the apparatus.
Figure 4:
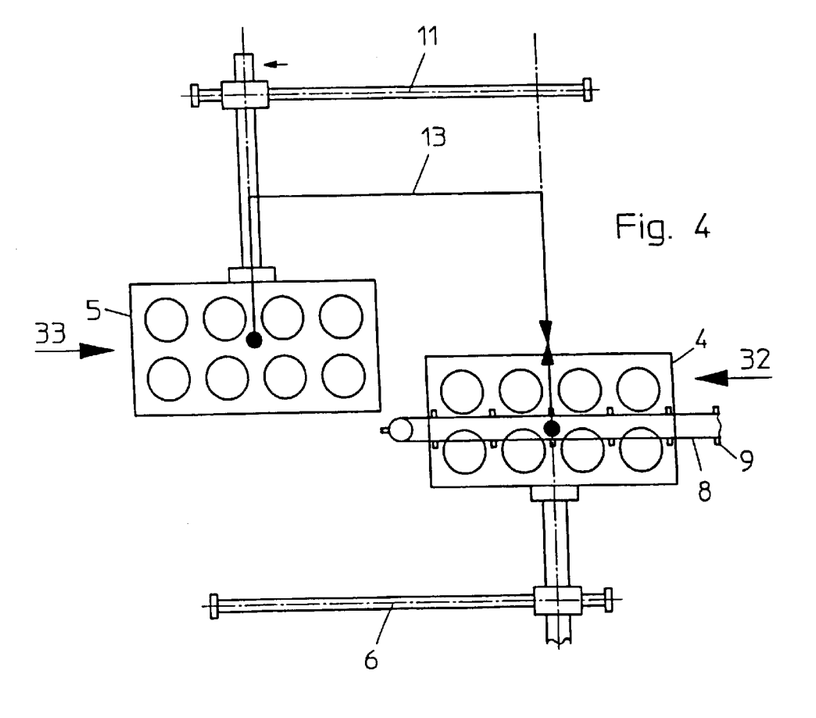

After the stack magazine 5 has been emptied, it is transferred into the position D and kept ready for the next magazine exchange, so the exchange can be performed very quickly with a short travel path. The arrows 12, 13 illustrate the directions of movement of the two stack magazines 4, 5.

This method permits all of the containers 2 to be stacked directly, without a further transfer, in stack magazines 4, 5, and permits counted stacks 7 to be produced simply. The apparatus can be reset simply for a different container shape through an exchange of the two stack magazines 4, 5 and a programming of the stroke required for clearing the individual stack rows. This can be done quickly and simply. With this method, the containers are not subjected to any large movements in the free atmosphere, which could cause the growth of microorganisms on the container surface.

Figure 5:
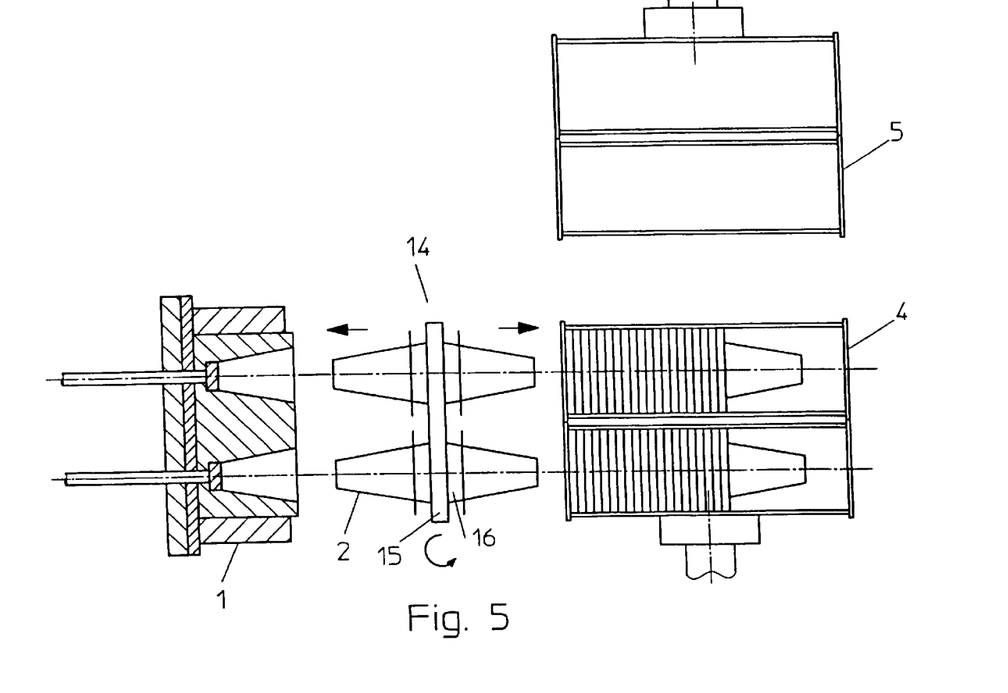
FIG. 5 is a side view of a second embodiment of the apparatus according to the invention.

FIG. 5 illustrates an expansion of the stacking method, in which the containers 2 are rotated by 180° prior to stacking; that is, they are pushed bottom-first into the stack magazines 4, 5. This is particularly advantageous for stack formation and the further guidance of the stacks to successive devices. In this case, a turning device 14 is disposed, as a transfer device, between the tipped shaping tool 1 and the stack magazines 4, 5. The turning device takes up the ejected containers 2 via a suction plate 15, possibly having centering arbors 16, then rotates the containers and transfers them into the stack magazines 4, 5, which, in this embodiment, are disposed so as to be displaced in the same manner—only at a distance from the shaping tool 1.

Figure 6:
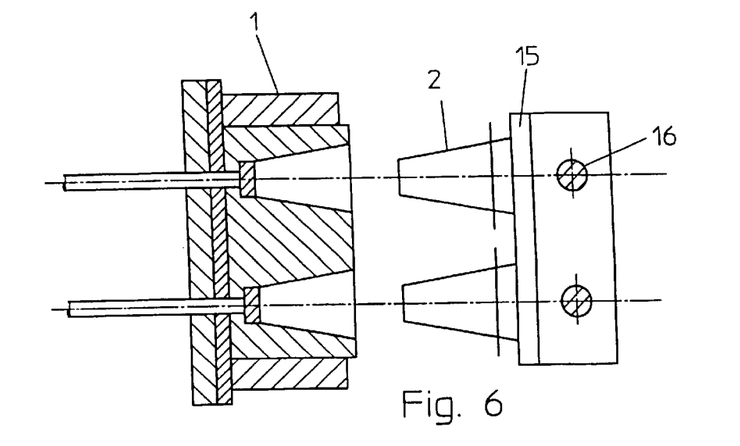
FIGS. 6 and 7 are a side view and plan view, respectively, of a third embodiment of the apparatus according to the invention.
Figure 7:
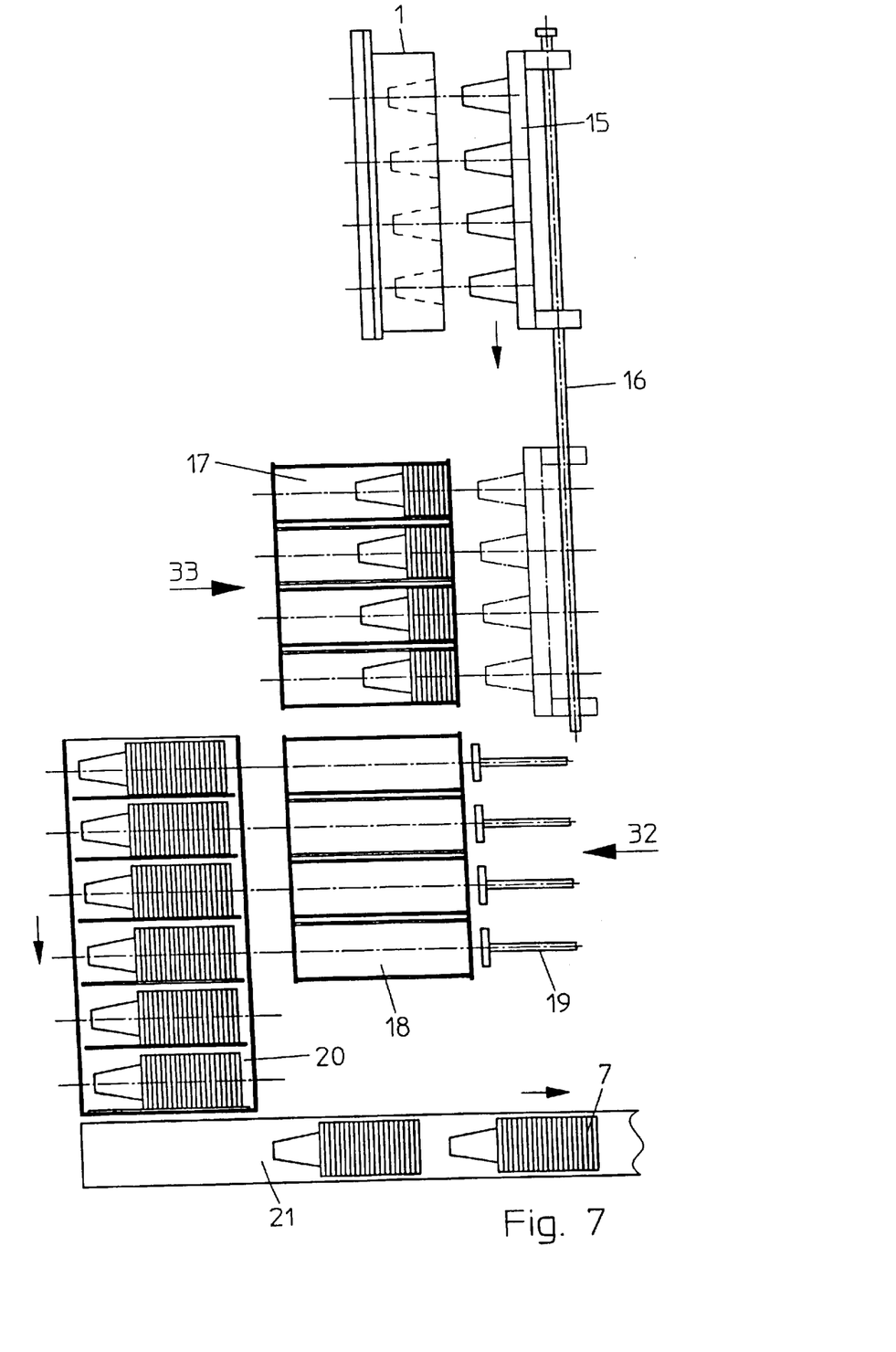

A variation of the method that is described in conjunction with the apparatus according to FIGS. 6 and 7 permits an improved accessibility of the shaping tool 1, e.g., for exchanging, cleaning and observing it. Also in this case, the ejected containers 2 are transferred to a transfer device in the form of a retaining or vacuum plate 15, which can be displaced transversely on guides 16, until it is in front of a stack magazine 17, into which the containers 2 are transferred. This transfer is effected by a relative movement between the stack magazine 17 and the retaining plate 15 by way of a drive, not shown, which operates at the stack magazine 17 or the retaining plate 15. This stack magazine 17 can be exchanged with a stack magazine 18 in the manner illustrated in FIG. 3. The stacks 7 are ejected in the same way, by means of an ejection device 19, onto a transport belt 20 and possibly onto a further transport belt 21.

Figure 8:
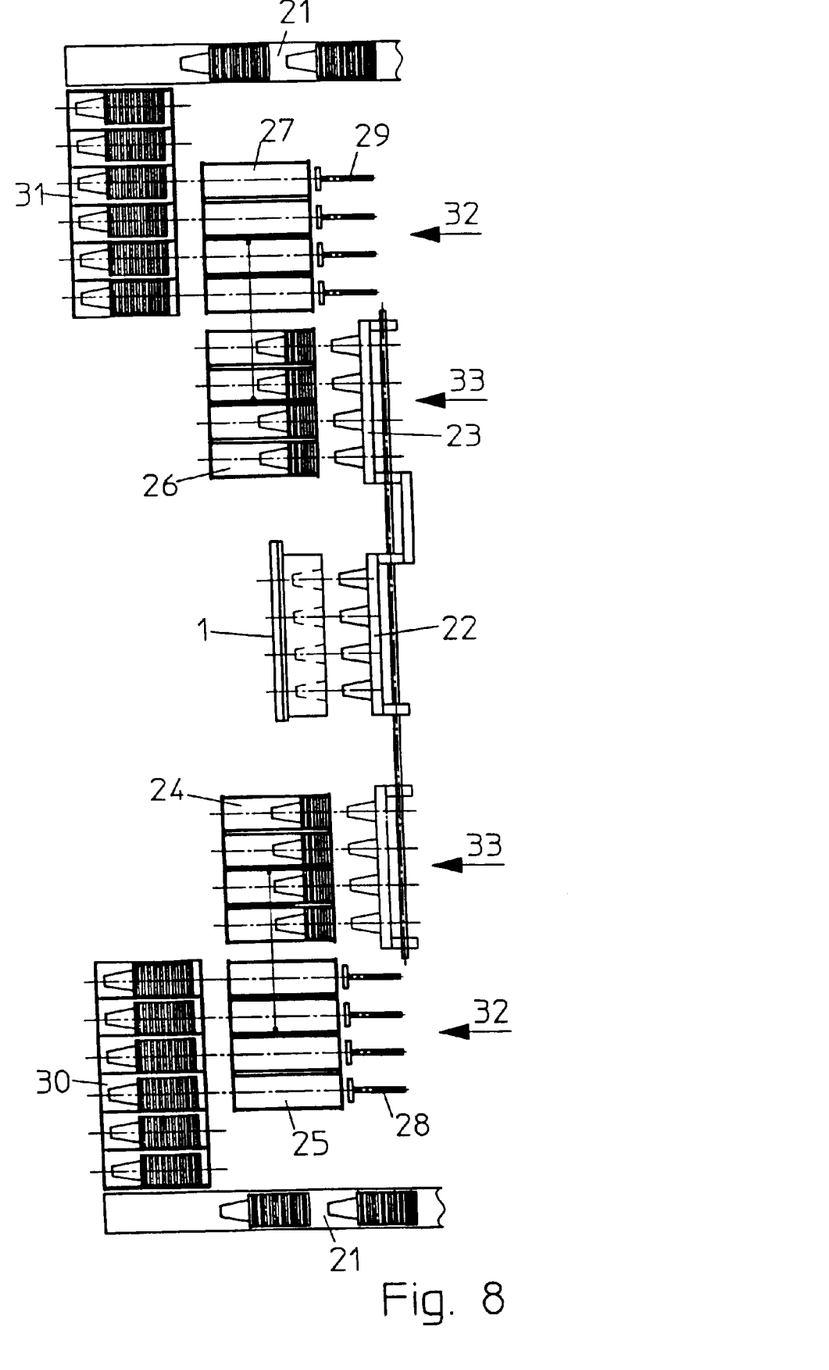
FIG. 8 is a plan view of an apparatus according to a fourth embodiment of the invention.

In an apparatus according to FIG. 8, the method is modified such that the containers 2 are transferred alternatingly in two directions by means of two retaining plates 22, 23. The retaining plate 22 guides the containers 2 on one side to a stacking station 33 with the stack magazines 24, 25 (as indicated by the dotted illustration of the plate 22), while the other retaining plate 23 guides them to a second stacking station 33 with the stack magazines 26, 27. Thus, two ejection devices 28, 29 and two transport belts 30, 31 are used. The stack magazines 24, 25 and 26, 27 are exchanged as described above.

This method offers the additional advantage that it can be used with very high cycle numbers of the shaping tool 1 if a cycle time in the order of magnitude of 1.5 seconds is insufficient to guide the containers 2 that have been taken up by the transfer device to a lateral stacking station 33, and back in front of the shaping tool 1.

Figure 9:
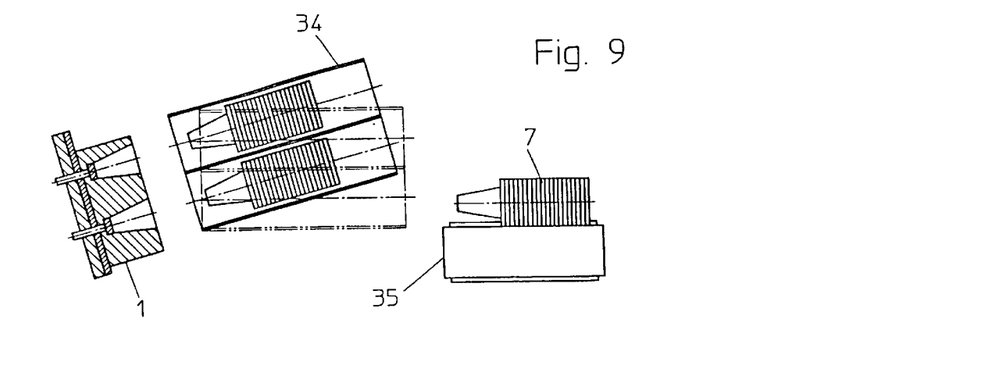
FIGS. 9 and 10 show a variation of the invention having pivotable and possibly traveling stack magazines.
Figure 10:
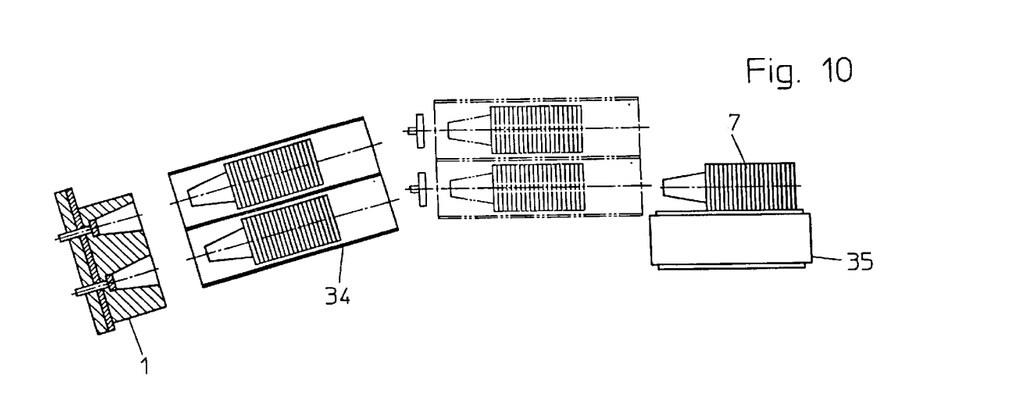

In the examples illustrated in FIGS. 1 through 8, the stacking is effected horizontally from the shaping tool. If the process is effected at a diagonal, as shown in FIGS. 9 and 10, it can be advantageous to pivot the stack magazines 34 disposed in the stack-removal station 32 into the horizontal position, as shown in FIG. 9, before the stacks 7 are ejected, and possibly move the magazines in the stacking direction, as indicated in FIG. 10, so they lie in front of a transverse conveyor belt 35.

Figure 11:
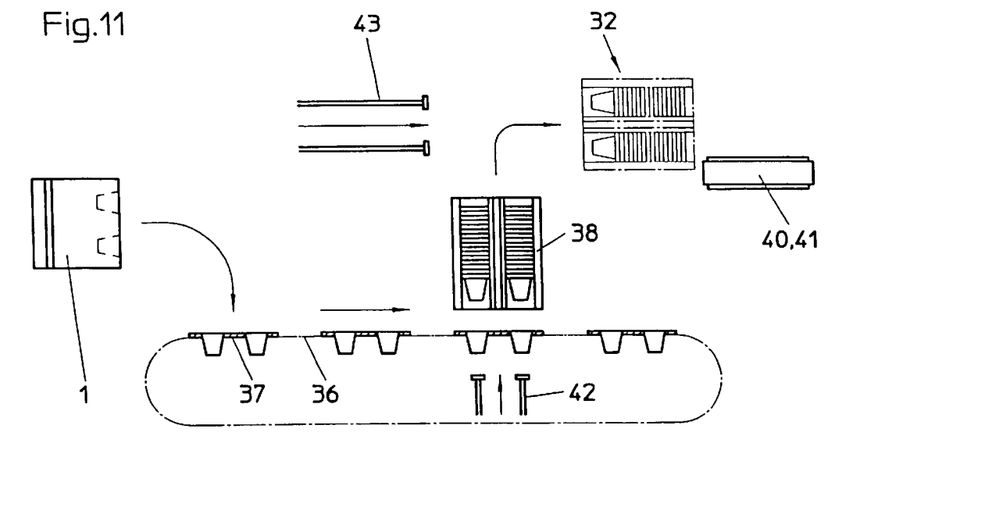
FIGS. 11 and 12 show a variation of the invention having a pallet belt.
Figure 12:
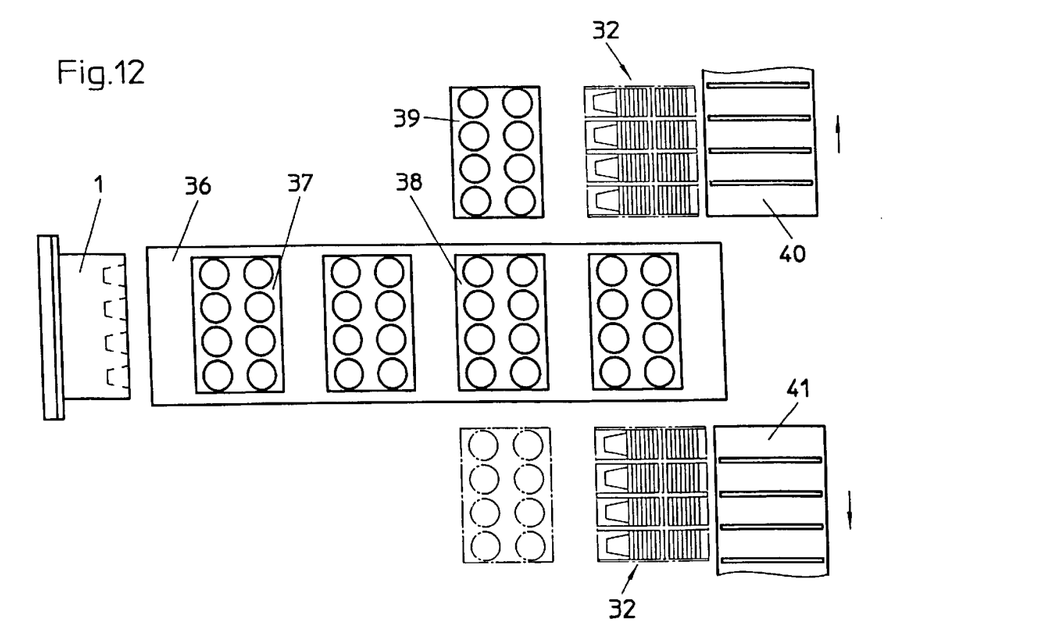

FIGS. 11 and 12 illustrate a modification of the method in which, prior to stacking, the containers 2 are transferred into a circulating pallet belt 36 having pallets 37 that are provided with holes. From these pallets, the containers are transferred into the vertical stack magazines 38, 39, which are alternatingly guided via a pallet 37, and thus into a stacking station 33, beneath which an ejection device 42 is disposed. These figures illustrate, by way of example, that the stack magazines 38, 39 are guided from the stacking station 33 to two stack-removal stations 32, so after the stack magazines 38, 39 have been raised and tipped in this stack-removal station 32, the stacks 7 are guided onto two transport belts 40, 41. The stacks 7 can be transported out in rows by a stack-removal device 43 through a corresponding lowering of the stack magazines 38, 39. It is also possible in the same manner, however, to guide the two stack magazines 38, 39 to a single stack-removal station 32, as in the other embodiments, through a corresponding U-shaped movement of the two stack magazines 38, 39.

The invention now being fully described, it will be apparent to one of ordinary skill in the art that many changes and modifications can be made thereto without departing from the spirit or scope of the invention as set forth herein.

What is claimed is:

1. A method for stacking containers that have been shaped and punched from a sheet of thermoplastic plastic in a shaping tool and guided to stack magazines, and for transferring stacks of containers to a successive device, comprising the following method steps:
 a) transferring the containers into a first stack magazine at a stacking station;
 b) after a predetermined number of containers per stack has been attained in the first stack magazine, displacing the first stack magazine into a stack-removal station, and transferring a second stack magazine out of a stack-removal station into the stacking station for transfer of the containers into the second stack magazine, between two cycles of the shaping tool; and
 c) while the containers are being stacked in the second stack magazine, emptying the first stack magazine, and guiding the stacks removed from the first stack magazine to a successive device.

2. The method according to claim 1, including directly transferring the containers out of the shaping tool into the stack magazines.

3. The method according to claim 1, including initially transferring the containers into a pallet belt and then transferring the containers out of the pallets of the belt into the stack magazines.

4. The method according to claim 1 including displacing the first and second stack magazines to a designated stack-removal station.

5. The method according to claim 1 wherein the stack magazines have a plurality of rows of stack housings, and said step of displacing includes intermittently displacing each stack magazine in height in the stack-removal station, and said step of emptying includes emptying one row of stacks in each intermittent rest position.

6. The method according to claim 1, further comprising after a predetermined number of containers per stack has been attained in the second stack magazine, displacing the second stack magazine into the stack-removal station, and transferring the first stack magazine out of the stack-removal station into the stacking station between two cycles of the shaping tool; and while the containers are being stacked in the first stack magazine, emptying the second stack magazine, and guiding the removed stacks to a successive device.

7. The method according to claim 1 including displacing the two stack magazines between the stacking station and the stack-removal station along respective U-shaped paths with opposite respective directions of movement.

8. The method according to claim 7 wherein said step of displacing the two stack magazines includes: lowering the first stack magazine, after receiving the predetermined number of containers, from the stacking station, laterally displacing the lowered first stack magazine, and raising the laterally displaced first stack magazine into the stack removal station; and raising the second stack magazine, after removal of the containers, from the stack removal station, laterally displacing the raised second stack magazine, and lowering the laterally displaced second stack magazine into the stacking station.

9. The method according to claim 1, including during said step of transferring the containers, initially transferring the containers to a transfer device which then transfers the containers into the stack magazines.

10. The method according to claim 9, further including rotating the containers by 180° in the transfer device prior to stacking.

11. The method according to claim 9, including displacing the containers perpendicular to their direction of ejection from the shaping tool via the transfer device, and guiding the containers to a laterally disposed said stacking station having first and second stack magazines.

12. The method according to claim 11, wherein two transfer devices are provided, and further comprising: alternatingly transferring the containers to the two transfer devices; and guiding the transfer device to two laterally disposed respective stacking stations each having first and second stack magazines.

13. An apparatus for stacking containers, which have been formed from a sheet of thermoplastic plastic and ejected from a shaping tool after being shaped and punched out, by the method according to claim 1, comprising: said stacking station wherein containers ejected from the shaping tool are transferred to and stacked in a said stack magazine; said stack-removal station wherein stacks of containers are removed from a said stack magazine; and means mounting two said stack magazines for displacement in respective opposite directions between said stacking station and said stack-removal station between two cycles of said shaping tool.

14. The apparatus according to claim 13, wherein the stack magazine located in the stacking station is disposed directly in front of the shaping tool located in a transfer position.

15. The apparatus according to claim 13, further comprising a transfer device for transferring the containers from the shaping tool into the stack magazine at the stacking station.

16. The apparatus according to claim 15, wherein the transfer device includes a turning device for rotating the containers ejected from the shaping tool by 180° before transfer to the stack magazine.

17. The apparatus according to claim 15, wherein the transfer device includes a retaining plate that is mounted for displacement perpendicular to the direction of ejection of the containers from the shaping tool, and the stacking station is disposed to the side of the shaping tool.

18. The apparatus according to claim 15, wherein the transfer device comprises two displaceable retaining plates, which are mounted for alternating movement to respective stacking stations each having a respective two of said displaceable stack magazines.

19. The apparatus according to claim 15, wherein the transfer device comprises a circulating pallet belt.

* * * * *